United States Patent Office 3,361,451
Patented Jan. 2, 1968

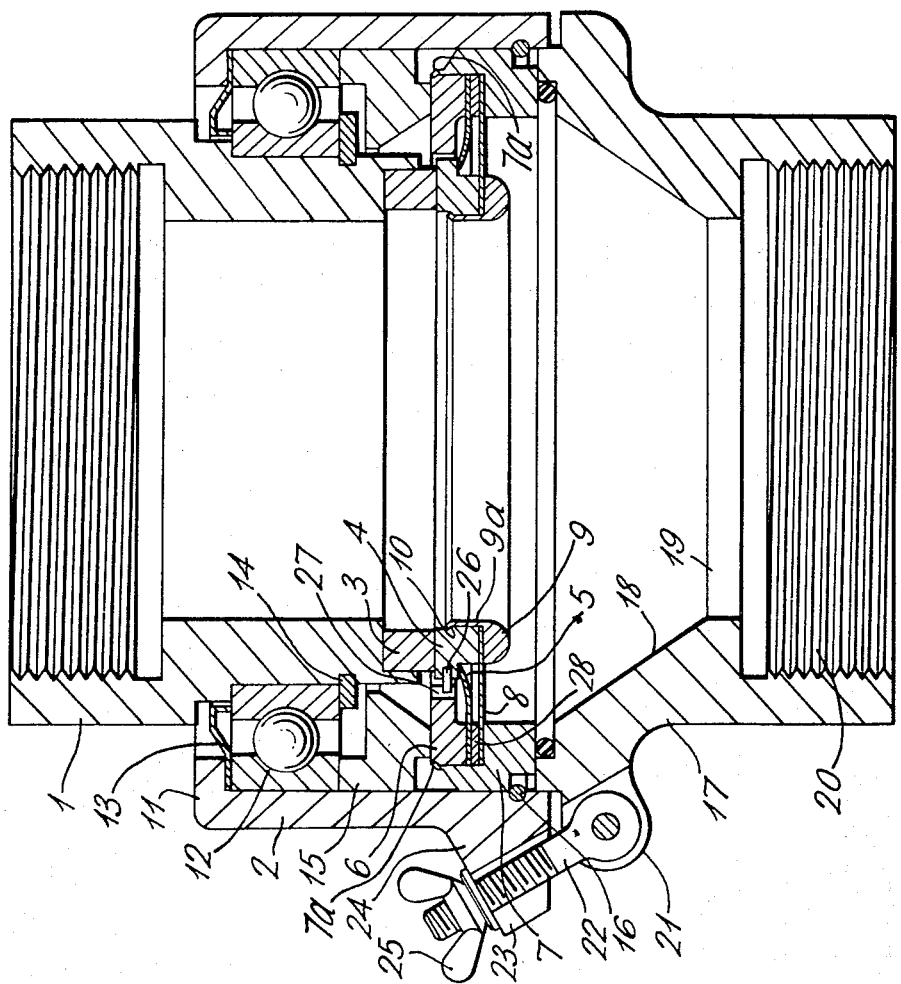

3,361,451
ROTARY UNIONS
William Murray, Leamington Spa, and Gordon Richard Walker, Southam, England, assignors to Filton Limited, Leamington Spa, England
Filed Mar. 29, 1965, Ser. No. 443,296
Claims priority, application Great Britain, Mar. 31, 1964, 3,270/64
1 Claim. (Cl. 285—276)

ABSTRACT OF THE DISCLOSURE

A rotary fluid-covering union comprising relatively rotatable inner and outer tubular members and co-operating seal rings which work in rotary sliding sealing contact with one another, one seal ring being carried by the inner member and the other being an axially floating ring; a circumferential set of leaf springs urging the floating ring against the first seal ring; two outer rings between which the outer ends of said springs are fixed and a flexible diaphragm which is secured between the outer rings and sealed to the axially floating ring; the outer rings being radially located in one end of the outer tubular member and a withdrawable tubular clamping element securing the outer rings in the operative position by pressure thereon.

---

The present invention relates to an improved rotary fluid-conveying union comprising relatively rotatable members, e.g., unions in which one of said members is adapted to be connected to a supply and the other to serve a fluid delivery means, and the invention is particularly well suited for conveying beer, wines, spirits or other liquids, where frequent cleaning of sterilizing of the union is necessary.

The invention aims at a compact form of such a union which lends itself to easy disassembly to give access to the parts liable to contamination.

To this end, the invention comprises a rotary fluid-conveying union comprising relatively rotatable inner and outer members and co-operating seal rings adapted to make rotary sliding sealing contact with one another, one of the said rings being carried by said inner member and the other ring being an axially floating ring which is urged against the first said ring by means of a circumferential set of leaf springs the outer ends of which are fixed between two outer rings which also secure between them a flexible sealing diaphragm which is also sealed to the axially floating ring; the said outer rings being secured in relation to the outer member by a withdrawable tubular clamping element.

The tubular element may be bolted to the outer member, e.g., by way of pivoted bolts on the one engaging peripheral recesses in the other. For example the element may be flanged and carry pivoted bolts which engage peripheral notches or recesses in the flange of the outer member and are secured thereto by wing or other nuts.

The tubular element may transmit sealing pressure to the outer rings by way of an O-ring.

A retainer ring may be sprung into an annular groove in the outer member for axially retaining the outer rings in such member.

The outer member may contain a ball, roller or other bearing retained by a circlip in relation to the inner member and a spacer ring may be provided between the bearing and the outer rings.

In order that the invention may be the more clearly understood, reference is hereinafter made to the accompanying drawing, in which one embodiment of a rotary fluid-conveying union according to the invention is illustrated by way of example.

The rotary union comprises inner and outer relatively rotatable members 1 and 2, the inner member 1 carrying a seal ring 3, e.g., of carbon, and co-operating therewith is a seal ring 4, e.g., of stainless steel, the sealing being lapped or otherwise formed with a smooth finish to ensure effective sealing when they rotate in sliding contact with one another. The ring 4 is an axially floating ring which is urged against the ring 3 by means of a circumferential set of leaf springs 5, the outer ends of which are fixed between two outer rings 6 and 7 which also secure between them a flexible sealing diaphragm 8 which is also sealed to the axially floating ring, by means of a ring 9 having a tubular extension 9a the free end of which is peened over a shoulder 10 provided by the floating seal ring 4. The ring 7 is peened over the ring 6 at 7a.

The springs may be of truncated triangular form and preferably are produced by radially slitting or slotting a flat ring to its inner periphery and leaving a continuous outer ring for fixing between rings 6 and 7.

The outer member is flanged at 11 and contains a ball bearing 12 sealed by a bearing seal 13. The bearing is retained on the inner member 1 by means of a circlip 14, and a spacer ring 15 is provided between the bearing and the ring 6.

The outer ring 7 is retained in the outer member 2 by means of a retainer 16 sprung into a groove in such member, and the assembly is completed by a tubular clamping element 17. This element has a sloping inner surface 18 converging towards the axis of the said element to an opening 19 leading to the cylindrical bore 20. The said element has a peripheral flange 21 in notches of which are pivoted, bolts 22 (e.g., three) which engage notches 23 in a flange 24 of the outer member and are secured by wing nuts 25. A compressible O-ring is provided between the tubular element 17 and the outer ring 7.

By unclamping and removing the tubular element, the seal unit comprising the floating seal ring, the springs, the diaphragm and the outer rings can be removed for sterilizing. If desired the spacing ring can also be removed and the circlip withdrawn so that complete disassembly of the components of the union can be readily achieved.

The floating ring may be held against rotation by the clamping action or positive means may be provided for this purpose.

The said ring may be held against rotation relatively to the ring 6 by one or more torque pins 26 engaging a groove 27 in the ring 6.

The springs and the diaphragm may be spaced by a suitable washer 28.

What we claim is:
1. A rotary fluid-conveying union comprising relatively rotatable inner and outer tubular members; co-operating first and second seal rings adapted to make rotary sliding contact with one another, the first of said seal rings being carried by said inner member and the second said seal ring being an axially floating ring; a circumferential set of leaf springs urging said floating seal ring against said first seal ring; two outer rings between which the outer ends of said springs are fixed and a flexible diaphragm which is secured between said outer rings and which is sealed to said axially floating ring; said outer rings being housed in one end of said outer tubular member; means co-operating with the inner wall of said outer tubular member for axially retaining said outer rings within the said outer tubular member, a withdrawable tubular clamping element separate from said outer rings and radially located in the said one end of the outer tubular member and swing bolt means carried by said tubular clamping element and co-operating with said outer tubular member for operating said clamping element to hold said outer rings securely in operative positive in said outer tubular member.

References Cited

UNITED STATES PATENTS

| | | | |
|---|---|---|---|
| 2,276,221 | 3/1942 | Magnesen | 285—225 X |
| 1,840,483 | 1/1932 | Brown et al. | 285—275 X |
| 2,000,341 | 5/1935 | Larsh | 277—90 |
| 2,723,136 | 11/1955 | Deubler | 285—276 X |
| 3,160,418 | 12/1964 | Barske | 277—90 |

CARL W. TOMLIN, *Primary Examiner.*

T. F. CALLAGHAN, *Examiner.*